United States Patent [19]

Midland

[11] Patent Number: 4,560,910
[45] Date of Patent: Dec. 24, 1985

[54] PARABOLIC WAVEFORM GENERATOR

[75] Inventor: Richard W. Midland, Inverness, Ill.

[73] Assignee: Zenith Electronics Corporation, Glenview, Ill.

[21] Appl. No.: 572,104

[22] Filed: Jan. 19, 1984

[51] Int. Cl.⁴ ............................................. H01J 29/58
[52] U.S. Cl. .................................................... 315/382
[58] Field of Search ...................... 315/382, 382.1, 370, 315/371, 368; 307/490, 246; 328/142, 187, 183

[56] References Cited

U.S. PATENT DOCUMENTS

| Re. 30,271 | 5/1980 | Dietz | 315/371 |
| 3,412,281 | 11/1968 | Richards, Jr. et al. | 315/382 |
| 3,543,080 | 11/1970 | Wuensch | 328/187 |
| 3,784,869 | 1/1974 | Takahashi | 315/368 |
| 3,953,760 | 4/1976 | Matsuura et al. | 315/368 |

Primary Examiner—Theodore M. Blum

[57] ABSTRACT

A dynamic focusing circuit for a CRT includes a DC coupled parabolic voltage waveform generator having a first capacitor supplied with constant charging current from a transistor for developing a sawtooth voltage waveform thereacross, a first switch transistor for discharging the first capacitor at a horizontal frequency rate, a second capacitor DC coupled to the first capacitor through a voltage-to-current generator transistor for developing a parabolic voltage waveform thereacross and a second switch transistor for discharging the second capacitor in synchronism with the first capacitor. Tilt and amplifier control transistors are DC coupled to the second capacitor. A vertical rate parabolic correction waveform is also developed by similar circuitry. The upper transistor in a cascode amplifier develops a high voltage replica of both the horizontal and vertical parabolic correction waveform voltages for application to the focus electrode of a CRT. Horizontal and a vertical amplifier transistors are coupled in parallel in the lower portion of the cascode amplifier and are supplied with the corresponding parabolic correction voltages.

10 Claims, 1 Drawing Figure

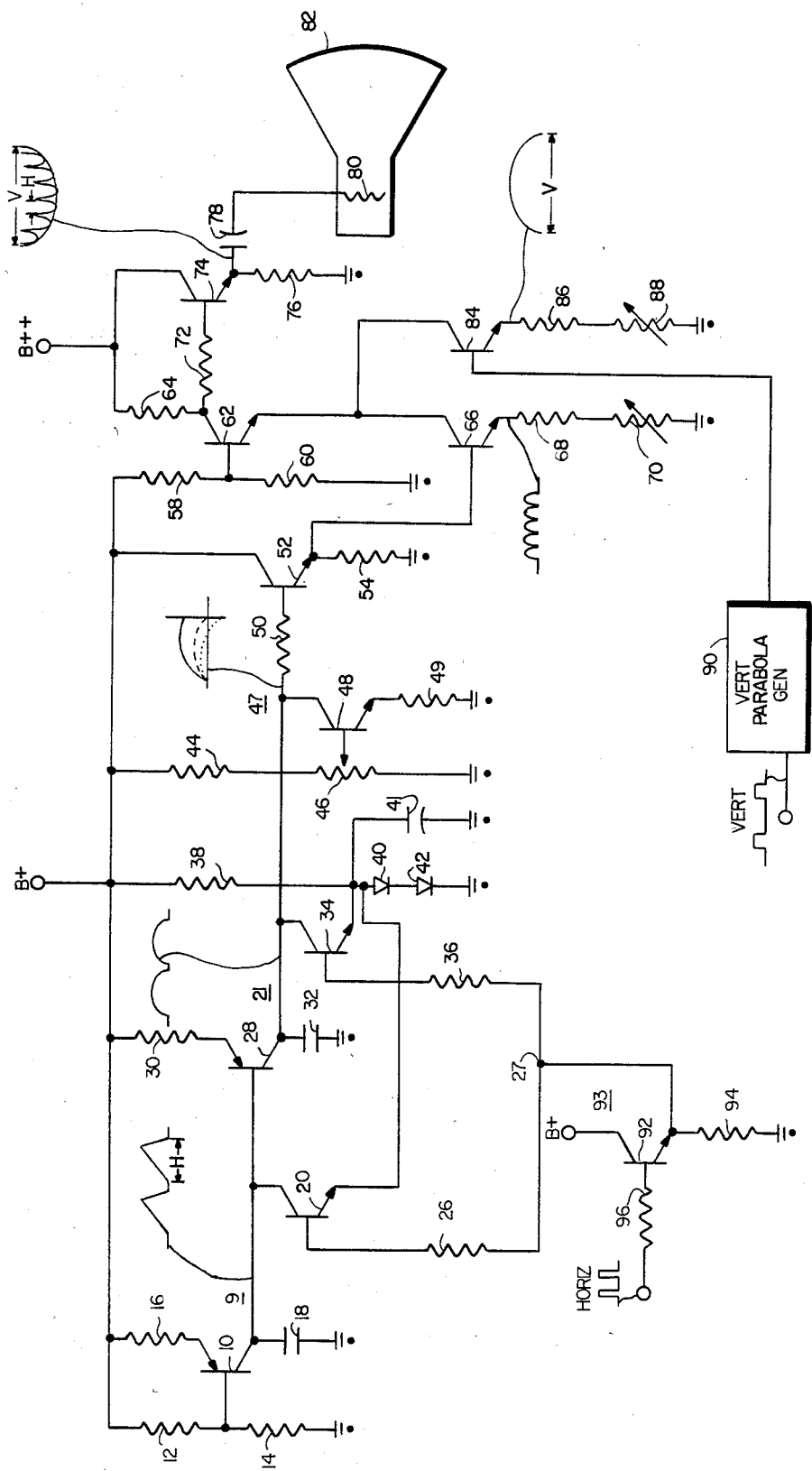

PARABOLIC WAVEFORM GENERATOR

BACKGROUND OF THE INVENTION AND PRIOR ART

This invention relates generally to dynamic focus circuits for cathode ray tube (CRT) displays and specifically to parabolic voltage waveform generators for producing appropriately shaped voltage waveforms for dynamic focussing.

In CRTs, the radius of deflection of the electron beam is not the same as the radius of curvature of the faceplate. As CRTs became "shallower", their overall depth decreased resulting in the deflection center being moved closer to the faceplate. Also, the radius of curvature of the faceplate was increased. Under these conditions, the electron beam traverses a much longer path to the extremities of the faceplate than it does to the center of the faceplate. In rectangular shaped tubes, the problem is exacerbated at the outermost points on the CRT "diagonals" where the electron beam travel path is longest. It is well known that the bundle of electrons in the beams tend to spread with distance travelled, leading to defocussing. There are many prior art circuits for providing dynamic focussing voltages to the electron beam to compensate, or attempt to compensate, for this defocussing effect. Since defocussing is a function of the square of the distance from the center of deflection, the dynamic correction frequency applied to the CRT focus electrode is generally parabolic in shape. Complete correction requires both a horizontal and a vertical component. In conventional television displays, the vertical parabolic correction frequency is 60 Hz and the horizontal parabolic correction frequency is 15,750 Hz.

The usual approach to obtaining the required parabolic voltages is to use the well known double integration process. In such a process, a pulse voltage of proper frequency is applied to a suitable capacitor for developing a sawtooth voltage waveform which, in turn, is applied to another suitable capacitor to form a parabolic voltage waveform. Because there are DC currents involved, a tilt in the wave shape of the parabola occurs unless the circuits are capacitively coupled. While the circuits appear simple, up to 70 percent of the energy in the pulse is lost in each integration. Thus, a relatively high voltage pulse is required to produce a usable parabolic voltage wave shape. Such circuits tend to become complicated and invariably require active devices to achieve adequate adjustments for parabola gain and tilt, which adjustments are required in a precise dynamic focussing system. A major drawback is that because of the AC coupling and the high pulse voltage requirements, the prior art dynamic focus correction circuits do not lend themselves to integrated circuit fabrication.

The rapidly increasing use of computers has given rise to a great need for precision in the associated CRT displays. In most applications it is imperative that the CRT be capable of very high resolution and of maintaining sharp beam focus throughout the entire display area. This major difference in the nature of the computer data, as distinct from the video content of most commercial television programming, imposes much more demanding requirements on "edge" focus of the CRT beam. It is precisely in this area however, that the CRT beam experiences the greatest defocussing action because of the longer travel path. There is thus a need in the art for a relatively simple parabolic voltage generating circuit that may be readily fabricated in integrated circuit form, readily controlled as to amplitude and tilt, and precisely controlled as to frequency.

OBJECTS OF THE INVENTION

A principal object of this invention is to provide a novel parabolic voltage generator.

Another object of this invention is to provide an improved parabolic voltage generator circuit for dynamic focussing.

A further object of this invention is to provide a parabolic voltage generator that lends itself to integrated circuit fabrication.

A still further object of this invention is to provide a parabolic voltage generator having readily controllable characteristics.

SUMMARY OF THE INVENTION

In accordance with the invention a DC coupled parabolic voltage generator comprises first means developing a sawtooth voltage across a first capacitor, second means developing a parabolic voltage across a second capacitor in response to the sawtooth voltage, and means for controlling the charging time of both capacitors with a common timing signal.

BRIEF DESCRIPTION OF THE DRAWING

Other objects and advantages of the invention will become apparent upon reading the following description in conjunction with the drawing, the single FIGURE of which depicts a schematic diagram of a parabolic voltage generator in a dynamic focussing system.

DESCRIPTION OF THE PREFERRED EMBODIMENT

In the drawing, a schematic diagram of a parabolic voltage waveform generator circuit constructed in accordance with the invention is shown coupled between ground and two voltages B+ and B++. The circuit components connected to B+, which is on the order of 12 to 24 volts, include low voltage DC coupled transistors suitable for fabrication in integrated circuit form. The components coupled to B++, which is on the order of 1,000 volts in a CRT monitor application, for example, are in discrete form.

A sawtooth voltage generator circuit 9 includes a transistor 10 having its emitter connected to B+ through a resistor 16 and its base connected to the junction of a voltage divider comprising a pair of resistors 12 and 14, seriesconnected between B+ and ground. A first capacitor 18 is connected between the collector of transistor 10 and ground. Transistor 10 functions as a current source for delivering current to capacitor 18 to develop a sawtooth waveform voltage thereacross.

A first switch transistor 20 has its collector connected to capacitor 18 and its emitter connected to the junction of a diode 40 and a resistor 38. The base of transistor 20 is connected through a resistor 26 to a terminal 27 where a timing signal, in the form of a switching voltage, generated in response to a horizontal frequency synchronizing signal, is developed. Switch transistor 20 is driven conductive at a horizontal frequency rate to discharge capacitor 18 to ground to complete the formation of the sawtooth waveform voltage as indicated by the representative encircled wave shape.

A synchronized switching circuit 93 includes a transistor 92 having its collector connected to B+, its emitter connected to ground through a resistor 94 and its base connected through a resistor 96 to an input source of horizontal frequency synchronizing pulses, preferably in the form of retrace pulses. The emitter output of transistor 92 is connected to terminal 27 and provides the timing signal by driving switch transistor 20 conductive at the horizontal frequency rate. It will be appreciated that the input signal to the base of transistor 92 need not comprise conventional horizontal retrace pulses in a television receiver, but may be the line scanning frequency retrace pulses of any display system used with the particular CRT.

The sawtooth voltage across capacitor 18 is applied to the base of a transistor 28, the emitter of which is connected through a resistor 30 to B+. The collector of transistor 28 is connected to a second capacitor 32, the other terminal of which is grounded. It will be appreciated that first capacitor 18 and second capacitor 32 are discrete elements and are not part of the integrated circuit. Transistor 28 and its accompanying circuit elements and capacitor 32 are part of a parabolic voltage generating network 21. Transistor 28 functions as a voltage-to-current generator to provide a sawtooth charging current flow into capacitor 32 in response to the sawtooth voltage applied to its base. The collector of transistor 28 is also connected to the collector of another switch transistor 34, the emitter of which is connected to the emitter of switch transistor 20. The base of transistor 34 is connected through a resistor 36 to terminal 27. Therefore switch transistor 34 is also driven conductive by the timing signal generated by transistor 92 in synchronism with switch transistor 20. When switch transistor 34 is driven conductive, it discharges capacitor 32 to complete development of the parabolic voltage waveform, as indicated by the representative encircled wave shape. Resistor 38 is connected in series between B+, diode 40, another diode 42 and ground. A decoupling capacitor 41 is connected across the series connected diodes 40 and 42. The connection of the emitters of switch transistors 20 and 34 through diodes 40 and 42 is used to adjust the waveform level.

The parabolic voltage is DC coupled to a novel tilt control circuit 47 consisting of a tilt transistor 48 having its collector connected to capacitor 32 and its emitter connected to ground through a resistor 49. The base of transistor 48 is connected to the slider on a potentiometer 46. The upper end of the potentiometer is connected to B+ through a resistor 44 and the lower end is connected to ground. By adjustment of the slider, the potential at the base of transistor 48 may be varied. This changes its conductivity and drains DC current from capacitor 32 to thereby affect the tilt of the parabolic voltage waveform.

Transistor 48, in effect, acts as a constant current drain for capacitor 32. The potentiometer at its base adjusts the amount of DC current. Consequently precise control of the parabolic waveform DC level is attained. As indicated, by changing the DC current drain, the tilt of the waveform may be changed. The solid line curve represents minimum drain, the dashed line curve, an intermediate drain level and the dotted curve a maximum drain. The precisely controlled parabolic voltage is further coupled through a resistor 50 to an amplifier transistor 52 having its collector connected to B+ and its emitter connected to ground through a resistor 54. The output of transistor 52 is taken from its emitter for further amplification.

A cascode amplifier 61 comprises a high voltage transistor 62 having its collector connected through a load resistor 64 to B++ and its emitter connected to the collectors of a parallel-connected pair of low voltage transistors 66 and 84. Transistor 62 is biased by having its base connected to the junction of a pair of resistors 58 and 60, connected between B+ and ground. Its load current is varied by changes in its collector-emitter path resulting from conduction changes in transistors 66 and 84.

Horizontal amplifier transistor 66 has its emitter connected to ground through a fixed resistor 68 and a variable resistor 70. Its base is connected to the emitter of transistor 52 and is thus supplied with the horizontal frequency-synchronized parabolic correction voltage. As the conductivity of transistor 66 is changed by this signal, it changes the current in the emitter of transistor 62 and develops a high voltage replica of the horizontal parabolic waveform at the collector of transistor 62. Similarly, any change in conduction of vertical amplifier transistor 84 will affect the emitter current in transistor 62 and produce a high voltage replica of the vertical change in the output of transistor 62. Transistor 84 is of course supplied with a vertical frequency synchronized parabolic correction voltage.

The voltage developed at the collector of transistor 62 is coupled through a resistor 72 to the base of an emitter follower transistor 74 having its collector connected directly to B++ and its emitter connected to ground through a resistor 76. Its emitter signal is AC coupled through a capacitor 78 to the focus electrode 80 of a suitable CRT 82.

Since the dynamic focus correction voltage required for the CRT varies not only as a function of the horizontal displacement of the electron beam but also as a function of its vertical displacement, full correction requires a vertical parabolic correction voltage in addition to the horizontal correction voltage. Thus vertical amplifier transistor 84 has its emitter connected through a fixed resistor 86 and a variable resistor 88 to ground and its base connected to a block 90 labelled vertical parabola generator. The input to block 90 is preferably a vertical synchronizing frequency pulse signal. It will be appreciated that the circuitry in block 90 may duplicate that described for the horizontal parabola generator with suitable changes for the difference in frequency involved.

The variable resistors 70 and 88 are used to adjust the amplitudes of the horizontal and vertical parabolic waveforms to compensate for individual requirements of the CRT display and associated circuitry. As indicated by the associated waveforms, the parabola at the emitter of transistor 66 occurs at the horizontal or line scanning frequency whereas that at the emitter of transistor 84, occurs at the much lower vertical field rate. The composite waveform at the emitter of transistor 74 is seen to include both horizontal and vertical components and consists of a vertical rate parabolic voltage, upon which are superimposed a multiplicity of horizontal rate parabolic voltages.

It is recognized that numerous changes and modifications in the described embodiment of the invention will be apparent to those skilled in the art without departing from the true spirit and scope thereof. The invention is to be limited only as defined in the claims.

What is claimed is:

1. A DC coupled parabolic voltage generator for use in a dynamic focussing system for a CRT comprising:

first means including a current source transistor for supplying a substantially constant charging current to a first capacitor for developing a sawtooth voltage;

second means including a voltage-to-current generator transistor for supplying a sawtooth shaped charging current to a second capacitor for developing a parabolic voltage in response to said sawtooth voltage; and means comprising transistor switches coupled across said first and said second capacitors for controlling the charging time of both said first and said second capacitors as a function of a common timing signal.

2. The generator of claim 1 further including DC coupled tilt and amplitude control transistors.

3. The generator of claim 2 further including a switch transistor generating said common timing signal for operating said transistor switches to discharge said first and said second capacitors in synchronism with said common timing signal.

4. The generator of claim 3 wherein said second capacitor is directly coupled to the collector-emitter circuit of said tilt control transistor, and further including;
means for changing the conductivity of said tilt control transistor to alter the DC current flow in said second capacitor.

5. The generator of claim 4 wherein all said elements except said first and said second capacitors are fabricated in an integrated circuit.

6. A DC coupled parabolic voltage generator for use in a dynamic focussing system for a CRT comprising:

first means including a first capacitor and a first transistor supplying a substantially constant charging current thereto for developing a sawtooth voltage;

second means including a voltage-to-current generator transistor coupled to a second capacitor for supplying a sawtooth charging current to said second capacitor, responsive to said sawtooth voltage, for developing a parabolic voltage; and first and second transistor switches coupled across said first and second capacitors, respectively for discharging said capacitors in response to a common timing signal.

7. The generator of claim 6 including means responsive to a synchronizing signal for generating said common timing signal for said first and second transistor switches.

8. The generator of claim 7 further including a tilt control transistor DC coupled across said second capacitor; and
means for changing the conduction of said tilt control transistor to drain DC current from said second capacitor.

9. A dynamic focussing circuit for a CRT comprising:

first capacitor means and first transistor switch means for developing a sawtooth voltage;

second capacitor means and second transistor switch means for developing a parabolic voltage responsive to said sawtooth voltage;

said second capacitor means including voltage-tocurrent generator means DC coupled to said first capacitor means;

means for applying a common synchronizing timing signal to said first and to said second transistor switch means to control and synchronize the development of said sawtooth voltage and said parabolic voltage;

high voltage cascode amplifier means having an input transistor coupled to receive said parabolic voltage; and means for coupling the output of said high voltage cascode amplifier means to said CRT.

10. The focusing circuit of claim 9 wherein said high voltage cascode amplifier means include a second input transistor coupled in parallel with said input transistor and wherein means are provided for generating a second parabolic voltage for application to said second input transistor, said parabolic voltage and said second parabolic voltage each being at a frequency corresponding to one of the horizontal and vertical scanning frequencies, respectively, for said CRT.

* * * * *